Feb. 12, 1924.

I. HARRISON

BERRY STRIPPING MACHINE

Filed Feb. 8, 1922     3 Sheets-Sheet 1

1,483,725

Inventor
Isaac Harrison,
by his Attorneys

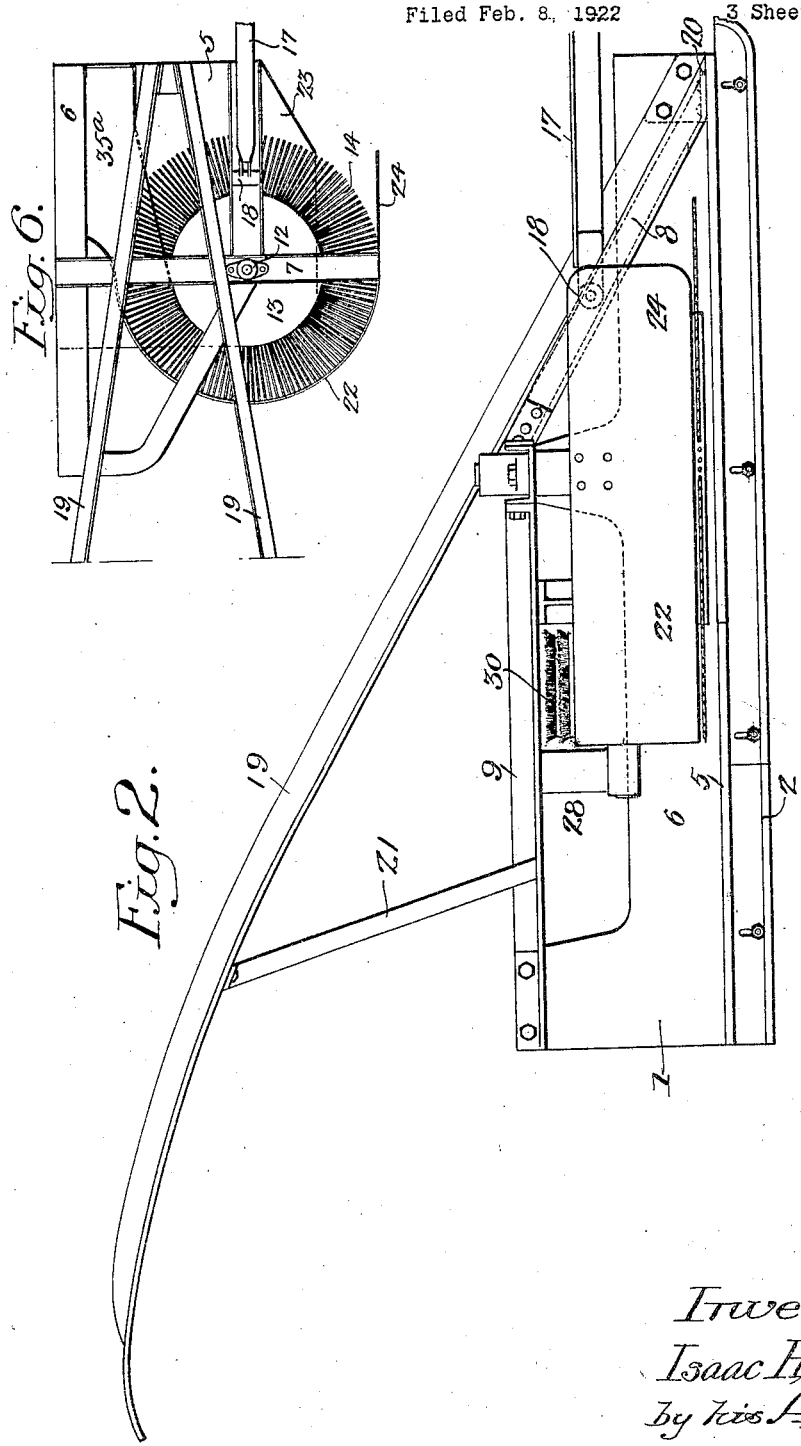

Feb. 12, 1924.
I. HARRISON
BERRY STRIPPING MACHINE
Filed Feb. 8, 1922
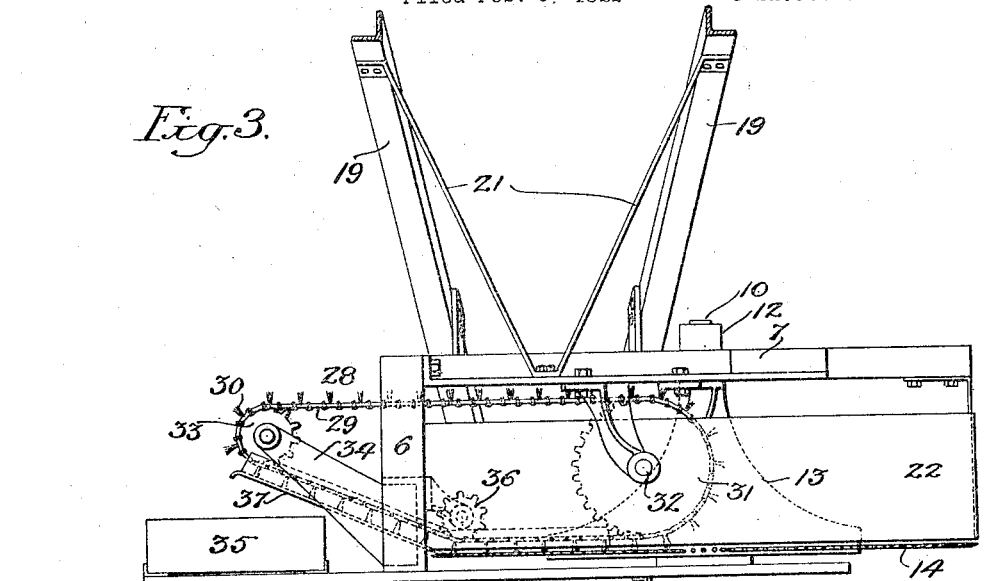
Inventor
Isaac Harrison,
by his Attorneys.
Howson Howson Patented Feb. 12, 1924.

1,483,725

UNITED STATES PATENT OFFICE.

ISAAC HARRISON, OF CREAMRIDGE, NEW JERSEY.

BERRY-STRIPPING MACHINE.

Application filed February 8, 1922. Serial No. 534,916.

*To all whom it may concern:*

Be it known that I, ISAAC HARRISON, a citizen of the United States, residing in Creamridge, Monmouth County, New Jersey, have invented certain Improvements in Berry-Stripping Machines, of which the following is a specification.

The object of my invention is to provide a machine for removing the berries from low growing vines, such as cranberry vines, without materially disturbing the roots of the vines, or breaking the branches which carry the berries, and without bruising the berries.

This object I attain in the following manner, reference being had to the accompanying drawings, in which:

Fig. 2 is a side view;

Fig. 3 is a rear view;

Fig. 4 is a longitudinal sectional view on the line 4—4, Fig. 1;

Fig. 5 is an enlarged sectional view showing a portion of the rotating disk and one of the prongs, and Fig. 6 is a view of a modification.

Figure 1:
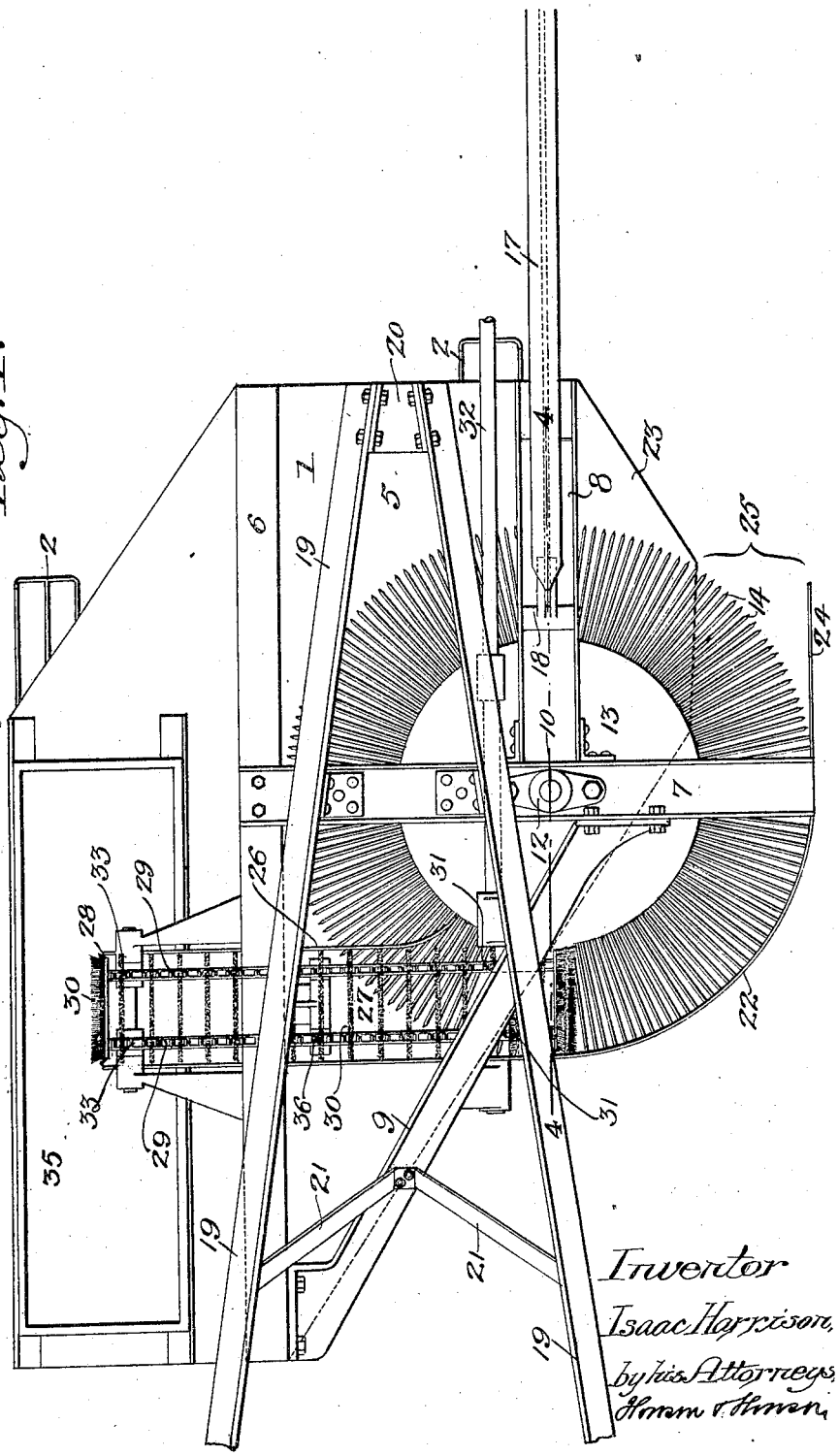
Fig. 1 is a plan view of my improved berry stripping machine.

Referring to the drawings, 1 is the frame of the machine mounted on runners 2. These runners are T-shaped in cross section and are adjustably secured to slotted angle irons 3 by bolts 4. By this construction, the frames can be readily raised or lowered. The frame has a floor 5 and a longitudinal member 6 arranged on edge. 7 is a transverse beam secured to the longitudinal member 6. This beam overhangs the table and a forward inclined brace 8 extends from the beam to the floor 5. A rear brace 9 extends from the beam to the rear of the longitudinal member 6.

10 is a vertical shaft resting on a step bearing 11 on the floor 5 and in a bearing 12 in the beam 7. Mounted on the vertical shaft is a hub 13 having prongs 14 radiating from its periphery. The prongs are on a horizontal plane and are located comparatively close to the ground so as to engage the vines properly.

In the present instance, the hub is in the form of a cone. Secured to the under side of the hub by screws 15 is a ring 16. The prongs 14 project from the ring, which has a series of holes bored therein the proper distance apart, and the prongs are driven into the holes, as shown in Fig. 5. The ends of the prongs are preferably pointed, as shown in said figure, so as to penetrate the vines more readily. The hub, with its prongs, is free to rotate and is rotated by the prongs engaging the vines as the machine is driven over the ground, or cranberry bog.

17 is a pole pivoted to the forward brace 8, at 18. This pole may be attached to a tractor, or other power means, or the machine may be pulled by a horse, or may be manually pushed or pulled.

19 are handles, which are secured to a bracket 20 at the forward end of the floor 5 and are also secured to the beam 7. Braces 21 extend from the handles 19 to the rear brace 9. 22 is a curved guard plate, the lower edge of which extends close to the outer ends of the prongs 14. This guard plate is suspended at its outer end from the beam 7 and is secured to the longitudinal member 6 at its inner end.

The floor 5 is beveled at 23 and forms, with the straight extension 24 of the guard plate 22, a channel 25 for the vines. The prongs 14 extend into this channel. 26 is a guard plate spaced from the rear end of the guard plate 22, forming with said guard plate a passage 27 for the berries that are removed from the vines. In this passage is an endless conveyer 28, in the present instance, formed of two endless chains 29 and brush bars 30 extending from one chain to the other. The conveyer passes over large sprocket wheels 31 on a driven shaft 32 adapted to bearings on the frame and around sprocket wheels 33 mounted on a bracket 34 overhanging a box, or other receptacle 35 for the berries, which is detachably mounted on the floor 5. Guiding sprocket wheels 36 hold the brushes close to the prongs so that, as the prongs pass under the conveyer, the berries are brushed off and are carried through the passage 27 and up the inclined plane 37 and discharged into the box, or other receptacle, 35.

In Fig. 6 a machine is shown, in which the endless conveyer is not used, the berries accumulating in the space 35ª at one side of the hub. The berries can be removed by hand or the machine can be turned over to discharge the berries, as it is comparatively light in weight.

The operation is as follows: The machine is adjusted to the height desired and is drawn over the cranberry bog, when cranberries are to be gathered. The vines, with the berries thereon, pass into the channel and engage the prongs below the berries, and, as the machine moves forward, the hub, with its prongs, is turned on its pivot. The portions of the vines above the prongs pass in front of the guard plate 22. As the prongs leave the line of the vines, the berries are pulled off of the vines, as the vines are drawn through the spaces between the prongs and under the guard 22. This action does not uproot the vines or break the stems to any appreciable extent. The berries pass into the path of the brushes of the conveyer and they are moved up the inclined plane and are discharged into the receptacle 35. After one row of vines has had the berries removed, the machine is moved so as to pass over another row, and so on over the entire width of the bog.

While the invention is especially adapted for removing cranberries from their vines, it will be understood that it can be used on other vines, or bushes.

I claim:

1. The combination in a machine for removing the berries from low growing vines, of a frame; a hub having substantially a vertical axis and having a series of prongs projecting horizontally from the periphery thereof and so located, in respect to the ground, as to engage the vines under the berries; means for preventing the vines engaging the prongs except at one side of the center of the hub so that the vines will turn the hub as the machine is moved past the vines; and guards for preventing the vines from being drawn past the ends of the prongs, the vines being drawn through the spaces between the prongs, the berries remaining upon the surface of the prongs.

2. The combination in a machine for removing berries from low growing vines, of a frame arranged to be moved over the ground; a hub mounted on a vertical axis having a series of prongs projecting in a horizontal plane from the periphery of the hub and arranged close together so as to prevent the berries passing through the spaces between the prongs; a floor, preventing the vines engaging the prongs except at one side of the center of the hub so that the vines will turn the hub as the machine is moved past the vines; and a segmental guard, at the periphery of the pronged hub forming, with the floor, a channel for the vines, the guard also preventing the vines from being drawn past the ends of the prongs.

3. The combination in a machine for removing berries from low growing vines, of a frame adapted to be traversed over the ground; a hub pivotally mounted on the frame and having a series of prongs projecting from its periphery in substantially a horizontal plane, and arranged close together to prevent the passage of berries, said prongs extending beyond the side of the frame; and a curved guard spaced from the side of the frame and extending over the prongs, said guard being curved at the rear to follow the outline of the prongs and forming a channel for the vines at the forward end, and also forming a channel for the berries as they are removed from the vines by the turning action of the hub.

4. The combination in a machine for removing berries from low growing vines, of a frame adapted to be traversed over the ground; a vertical shaft on the frame; a hub mounted to rotate freely on the shaft; prongs projecting from the periphery of the hub and extending over the side of the frame; and a suspended guard carried by the frame and extending over the edges of the prongs and acting, with the prongs, to remove the berries from the vines, as the vines pass from under the prongs.

5. The combination of a frame arranged to be moved over the ground; a hub mounted on a vertical pivot and arranged to rotate freely on the frame, said hub having a series of long prongs projecting outwardly from its periphery in a horizontal plane; a guard on the frame located at the ends of the prongs at the point where the berries are removed from the vines; a receptacle for the berries; and means for collecting and transferring the berries from the upper surface of the prongs after they have been removed from the vines and delivering them into the receptacle.

6. The combination of a frame adapted to be traversed over the ground; handles on said frame; an overhead beam supported by the frame; a vertical shaft having its bearings in the beam and the base of the frame; a hub mounted on the shaft; long prongs mounted on the periphery of the hub and beyond the edge of the frame, the said beam extending over the prongs; and a curved guard suspended from the beam and located at the ends of the prongs so as to prevent the berries from being withdrawn with the vines as the pronged hub is moved to one side of the line of travel of the frame.

7. The combination in a machine for removing berries from low growing vines, of a frame; runners on which the frame is mounted; means for allowing vertical adjustment of the frame on the runners; a hub arranged to rotate freely on the frame, said hub having prongs at its periphery extending over the edge of the frame; and a guard at the ends of the prongs, said guard having a straight portion forming a channel, with the frame, for the vines and acting, with the prongs, to remove the berries from the vines as the hub rotates.

8. The combination of a frame adapted to be moved over the ground; a hub mounted on a vertical axis and arranged to turn freely on the frame; long prongs projecting from the periphery of the hub; a segmental guard located above the projecting ends of the prongs at one side of the frame, said guard having a straight portion acting as a channel, with the edge of the frame, for the vines; a receptacle for the berries; and an endless belt conveyer having flights arranged to remove the berries from the prongs and to transfer them into the receptacle.

9. The combination in a machine for removing berries from low growing vines, of a frame adapted to be moved over the ground; an overhanging beam on the frame; a vertical shaft having its bearings in the frame and in the beam; a conical hub mounted on the shaft, the edge of the hub being substantially on a line with one edge of the frame; prongs projecting from the periphery of the hub; and a segmental guard acting as a channel, said guard being located above the outer ends of the prongs and suspended from the beam and forming a channel for the vines.

10. The combination in a machine for removing berries from low growing vines, of a frame; runners on which the frame is mounted; handles projecting rearwardly from the frame; a longitudinal member on the frame; a transverse beam secured to said longitudinal member and extending over the frame; a bearing in the beam and a bearing on the frame; a vertical shaft arranged to turn freely in the bearings; a conical hub; a series of long prongs projecting from the periphery of the hub, said prongs being pointed at their ends; a segmental guard suspended from the transverse beam and forming a channel for the vines; a receptacle for the berries; and an endless conveyer for collecting the berries from the prongs and discharging them into the receptacle.

11. The combination of a frame; a hub pivotally mounted on the frame so as to turn freely thereon; a ring secured to the under side of the hub, said ring having a series of holes in its periphery; and a series of prongs, one end of each prong being mounted in a hole in the ring, the outer end of each prong being pointed, the prongs being so spaced apart that the vines can pass between them, preventing the withdrawal of the berries as the machine passes away from the vines.

ISAAC HARRISON.